United States Patent [19]
Jang

[11] Patent Number: 5,919,113
[45] Date of Patent: Jul. 6, 1999

[54] HYDRAULIC CONTROL SYSTEM FOR AUTOMATIC TRANSMISSIONS

[75] Inventor: Jaeduck Jang, Kyungki-do, Rep. of Korea

[73] Assignee: Hyundai Motor Company, Seoul, Rep. of Korea

[21] Appl. No.: 08/960,624

[22] Filed: Oct. 29, 1997

[30] Foreign Application Priority Data

Oct. 29, 1996 [KR] Rep. of Korea ...................... 96-49422

[51] Int. Cl.⁶ .................................. F16H 61/26
[52] U.S. Cl. .......................... 477/156; 477/158; 477/130
[58] Field of Search .................................. 477/127, 130, 477/144, 148, 155, 156, 158

[56] References Cited

U.S. PATENT DOCUMENTS

| | | | |
|---|---|---|---|
| 5,537,887 | 7/1996 | Jang ..................................... | 477/155 X |
| 5,540,634 | 7/1996 | Jang et al. ............................. | 477/155 |
| 5,658,220 | 8/1997 | Jang ..................................... | 477/158 X |
| 5,674,153 | 10/1997 | Jang ..................................... | 477/158 X |

Primary Examiner—Khoi Q. Ta

[57] ABSTRACT

Disclosed is a hydraulic control system for automatic transmissions including a plurality of friction elements, comprising a hydraulic pressure source; hydraulic pressure regulating parts for controlling hydraulic pressure from the hydraulic pressure source; damper clutch control parts for actuating a damper clutch of the torque converter by supplying hydraulic pressure fed from the pressure regulating parts to the torque converter; shift control parts for selecting a shift mode by converting hydraulic pressure from the pressure regulating parts into drive pressure; hydraulic pressure control parts for controlling the drive pressure from the shift control parts; and hydraulic pressure distributing parts for suitably distributing hydraulic pressure from the hydraulic pressure control parts to each friction element, said hydraulic pressure distributing parts comprising a 1-2 shift valve; a 2-3/4-3 shift valve; and shift timing control parts having a shift timing control valve for supplying hydraulic pressure to an end clutch and to a kickdown servo, and a solenoid valve for controlling hydraulic pressure supply timing from the shift timing control valve to said end clutch and kickdown servo by control of a transmission control unit; and hydraulic pressure compensating parts for maintaining a suitable level of end clutch.

6 Claims, 7 Drawing Sheets

HYDRAULIC CONTROL SYSTEM FOR AUTOMATIC TRANSMISSIONS

FIELD OF THE INVENTION

The present invention relates to a hydraulic control system for automatic transmissions, and more particularly, to a hydraulic control system for automatic transmissions which prevents damage to an end clutch and engine run-up caused by a reduction in end clutch pressure when 4-3 downshifting in a power ON state, and prevents insufficient hydraulic flow during line pressure changes in a fourth-speed state.

BACKGROUND OF THE INVENTION

Conventional automatic transmissions used in vehicles include a torque converter, a multi-stage gearshift mechanism connected to the torque converter, and a plurality of friction element actuated by hydraulic pressure for selecting one of the gear stages of the gearshift mechanism.

A hydraulic control system for the automatic transmission operates by the selective supply of hydraulic pressure, the flow of which is generated by a hydraulic pump, to each friction element (for engagement or disengagement of the same) by a plurality of control valves such that shifting can be realized automatically and appropriate to the driving state of the vehicle.

Such hydraulic control systems generally comprise pressure regulating means for controlling the hydraulic pressure generated by the hydraulic pump, manual and automatic shift control means for selecting a shift mode, hydraulic pressure control means for controlling shift quality and shift response, a damper clutch control means for actuating a damper clutch of the torque converter, and hydraulic pressure distributing means for supplying an appropriate amount of hydraulic pressure to each of the friction elements.

Figure 6:
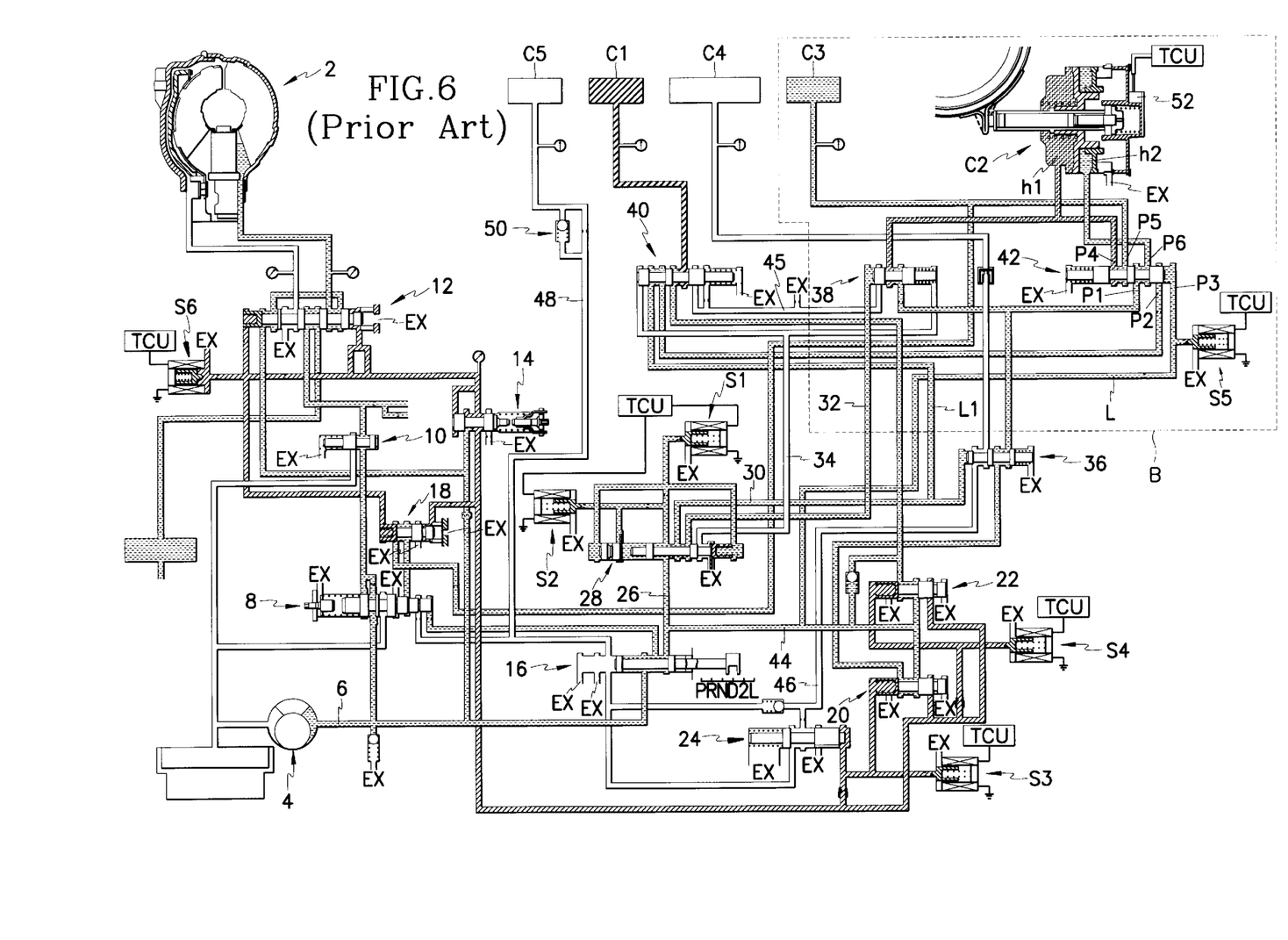
FIG. 6 is a circuit diagram during 4-3 downshifting of a conventional hydraulic control system.

Referring to FIG. 6, there is shown a hydraulic circuit diagram of a conventional hydraulic control system. As shown in the drawing, the hydraulic control system includes a torque converter 2 connected to an output shaft of an engine and which converts and multiplies engine power and transmits the same to a transmission, and a hydraulic pump 4 which generates oil flow to create hydraulic pressure for shift stage control.

Connected through lines to comprise the pressure regulating means and the damper clutch control means are a pressure regulator valve 8 for regulating pressure to a predetermined level, a torque converter control valve 10 for controlling pressure to a predetermined pressure level for the torque converter 2 and for lubrication, and a damper clutch control valve 12 for improving power transmission efficiency of the torque converter 2.

Part of the hydraulic pressure generated by the hydraulic pump 4 is received by a reducing valve 14 which reduces hydraulic pressure flowing therethrough to a level lower than line pressure, and by a manual valve 16 indexed with a selector lever operated by the user.

Part of the hydraulic pressure reduced to a predetermined level by the reducing valve 14 is supplied to a high-low pressure valve 18 which reduces line pressure in high speed ranges to minimize damage to the hydraulic pump 4, and part of the hydraulic pressure is supplied to first and second pressure control valves 20 and 22, the high-low pressure valve 18 and the first and second pressure control valves 20 and 22 comprising the hydraulic pressure control means.

Further, part of the pressure supplied to the first and second pressure control valves 20 and 22 is supplied to an N-R control valve 24 to be used as control pressure for the same, the N-R control valve 24 reducing shift shock when shifting from a neutral N range to a reverse R range.

The manual valve 16 communicates with a shift control valve 28, changing hydraulic pressure lines by operation of first and second solenoid valves S1 and S2, via a line 26, through which hydraulic pressure flows when in a drive D range. The manual valve 16 and the shift control valve 28 comprise the manual and automatic shift control means.

Second, third, and fourth speed lines 30, 32, and 34 are connected to the shift control valve 28 to supply hydraulic pressure to each valve of the hydraulic pressure distributing means for shift stage control. Namely, the second speed line 30 supplies hydraulic pressure to a left-side port of a 1-2 shift valve 36 to control the same, the third speed line 32 supplies hydraulic pressure to a left-side port of a 2-3/4-3 shift valve 38 to control the same, and the fourth speed line 34 supplies hydraulic pressure both to a right-side port of the 2-3/4-3 shift valve 38 to control the same and to a left-side port of a 2-4/3-4 shift valve 40 to control the same.

The first pressure control valve 20 realizes port conversion by operation of a third solenoid valve S3, while the second pressure control valve 22 realizes port conversion by operation of a fourth solenoid valve S4.

A first speed line 44 is branched off from the line 26 connected to the manual valve 16 to supply hydraulic pressure to the first and second pressure control valves 20 and 22, and to a rear clutch C1, or a first friction element acting as a first speed input element, after passing through the 2-4/3-4 shift valve 40 by control of the third and fourth solenoid valves S3 and S4.

A timing control line L is connected to the first speed line 44 such that line pressure flowing therethrough can be supplied to a timing control valve 42.

The shift timing control valve 42 either supplies or releases operational pressure to or from an end clutch C3, operating as an input element in third and fourth speeds, and is able to adjust the timing between the supply of hydraulic pressure to the end clutch C3 and control of a kickdown servo C2, operating as a reaction element in second and fourth speeds. Namely, the shift timing control valve 42, when a fifth solenoid valve S5 is controlled to OFF by the TCU, either supplies operational pressure to the kickdown servo C2 or to the end clutch C3.

Further, hydraulic pressure is able to be supplied from the first pressure control valve 20 to the kickdown servo C2, operating as a reaction element in the second speed, via the 1-2 shift valve 36.

Part of the above hydraulic pressure passing through the 1-2 shift valve 36 is fed to the end clutch C3, operating as an input element in the third speed, via the 2-3/4-3 shift valve 38 and the shift timing control valve 42. Here, the hydraulic pressure supplied to the end clutch C3 is also supplied to a release side chamber hi of the kickdown servo C2.

When the manual valve 16 is in the reverse R range, hydraulic pressure fed to a reverse first control line 46 is supplied to a low-reverse brake C4, operating as a reaction element in the reverse R range, via the 1-2 shift valve 36. The manual valve 16 is connected to a reverse second control line 48 for operation of a front clutch C5, operating as an input element.

A check valve 50 is disposed on the reverse second control line 48, the check valve 50 delaying the release of hydraulic pressure to improve shift quality.

A kickdown switch 52 is disposed on an operational side chamber h2 of the kickdown servo C2. The kickdown switch 52 is controlled to OFF when hydraulic pressure is being supplied to the operational side chamber h2, and controlled to ON when hydraulic pressure is being supplied to the release side chamber hi, a signal of the ON or OFF state of the kickdown switch 52 being transmitted to the TCU.

To allow skip shifting by converting operational pressure of the kickdown servo C2 according to shift stage, the 2-4/3-4 shift valve 40 is provided with ports such that hydraulic pressure from the second pressure control valve 22 passes through the 2-4/3-4 shift valve 40, is fed to the timing control valve 42, then supplied to the kickdown servo C2.

Reference numeral S6 in the drawing denotes a sixth solenoid valve which controls the damper clutch control valve 12 to operate or disengage the damper clutch of the torque converter 2.

In the hydraulic control system structured as in the above, during 4-3 downshifting in a power ON state, pressure of the end clutch C3 is controlled to communicate with the release side chamber h1 of the kickdown servo C2 in a state where the pressure level in the operational side chamber h2 is maintained.

That is, pressure of the end clutch C3 is initially maintained at a high level then slowly reduced by low duty control of the third solenoid valve S3. At the same time, a valve spool of the 2-3/4-3 shift valve 38 is moved to the right (in the drawing) by the release of fourth speed pressure, realized by control of the shift control valve 26, such that part of the hydraulic pressure supplied to the end clutch C3 is fed to the release side chamber h1 to disengage the kickdown servo C2.

Figure 7:
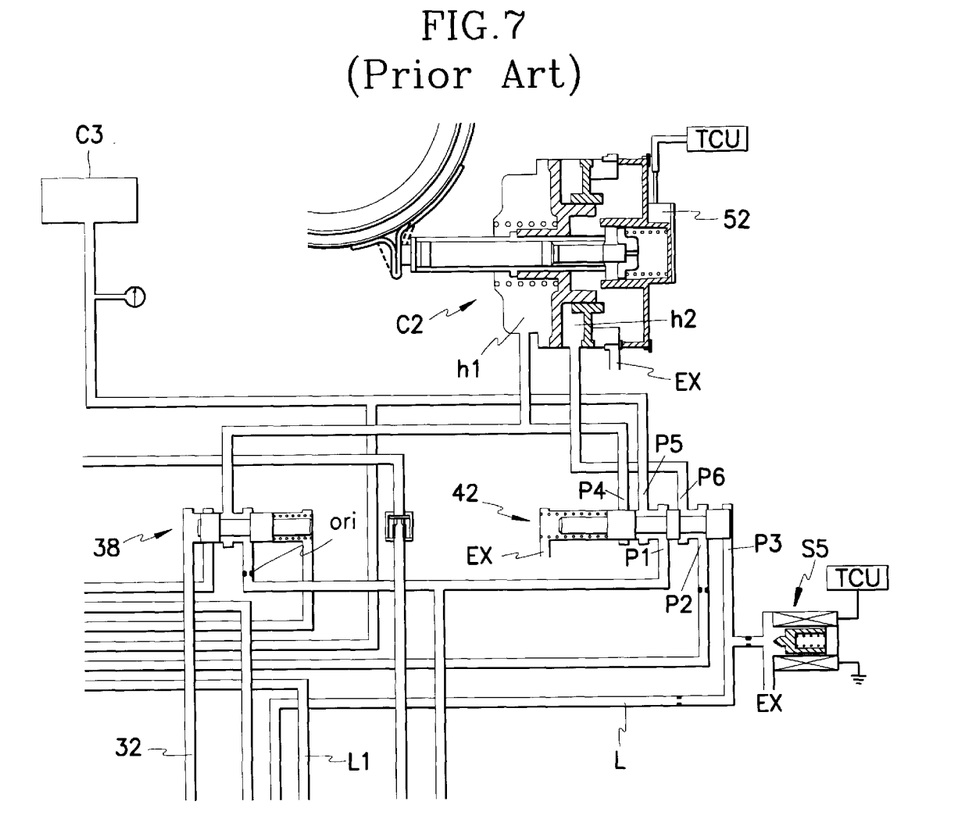
FIG. 7 is an enlarged view of section B of FIG. 6.

However, as shown in FIGS. 6 and 7, resulting from the formation of an orifice (ori) on a live leading into the 2-3/4-3 shift valve 38, pressure buildup in the release side chamber h1 of the kickdown servo C2 is delayed. Accordingly, the level of pressure supplied to the end clutch C3, connected to the release side chamber h1 through the shift timing valve 42, is temporarily reduced. That is, because the end clutch C3 receives hydraulic pressure from the release side chamber h1, a drop in pressure to the latter results in a drop in pressure to the end clutch C3.

When the level of hydraulic pressure to the end clutch C3 is reduced as in the above, engine run-up results, wherein engine revolutions are overly increased, such that the rear clutch becomes damaged.

Further, because operational pressure of clutch means operating as input elements in the third and fourth speeds is used for varying line pressure, and as the shift timing control solenoid valve controlling the shift timing control valve, which supplies hydraulic pressure to the clutch means, is always controlled to an ON state in the fourth speed, line pressure from the hydraulic pump is continuously emitted through the exhaust port of the shift timing control solenoid valve in the fourth speed such that the level of pressure is reduced.

SUMMARY OF THE INVENTION

The present invention has been made in an effort to solve the above problems. It is an object of the present invention to provide a hydraulic control system for automatic transmissions which prevents damage to a rear clutch and engine run-up caused by a reduction of end clutch pressure when 4-3 downshifting in a power ON state.

To achieve the above object, the present invention provides a hydraulic control system for automatic transmissions including a plurality of friction elements engaged at respective transmission speeds, comprising a hydraulic pressure source; hydraulic pressure regulating means for controlling hydraulic pressure from the hydraulic pressure source to constant line pressure; damper clutch control means for actuating a damper clutch of the torque converter by supplying hydraulic pressure fed from the pressure regulating means to the torque converter; shift control means for selecting a shift mode by converting hydraulic pressure from the pressure regulating means into drive pressure corresponding to each speed stage; hydraulic pressure control means for controlling the drive pressure from the shift control means; and hydraulic pressure distributing means for suitably distributing hydraulic pressure from the hydraulic pressure control means to each friction element for each speed, said hydraulic pressure distributing means comprising a 1-2 shift valve; a 2-3/4-3 shift valve; and shift timing control means having a shift timing control valve for supplying hydraulic pressure to an end clutch acting as an input friction element for third and fourth speeds and to a kickdown servo acting as a reaction friction element for second an fourth speeds, and a solenoid valve for controlling hydraulic pressure supply timing from the shift timing control valve to said end clutch and kickdown servo by control of a transmission control unit; and hydraulic pressure compensating means for maintaining a suitable level of end clutch pressure mounted on a line for supplying hydraulic pressure from the 1-2 shift valve to the 2-3/4-3 shift valve and the shift timing control valve.

The hydraulic pressure distributing means further comprises a 2-4/3-4 shift valve, wherein the shift timing control valve comprising a valve spool for controlling port conversion of the shift timing control valve, and being provided with a first port for receiving hydraulic pressure from the shift control means via the 1-2 shift valve, a second port for receiving hydraulic pressure from the shift control means via the 2-4/3-4 shift valve, a third port for receiving line pressure from the shift control means, a fourth port for receiving hydraulic pressure from a release side chamber of the kickdown servo, a fifth port for supplying hydraulic pressure coming through the fourth or first port to the end clutch, a sixth port for supplying hydraulic pressure coming through the first port of the second port to the operational side chamber of the kickdown servo, and a seventh port for closing the third port for fourth speed control by receiving hydraulic pressure from the shift control means.

The seventh port is connected to the 2-3/4-3 shift valve and the 2-4/3-4 shift valve.

The hydraulic pressure compensating means includes a bypass line formed between first and second branch lines, split from a line supplying hydraulic pressure from a 1-2 shift valve to a 2-3/4-3 shift valve and the shift timing control valve; a check valve disposed on the bypass line and which suppresses the hydraulic pressure flowing to the 2-3/4-3 shift control valve from the shift timing control valve; a first orifice formed on a line before connection of the same with the first branch line; and a second orifice formed on the second branch line.

The check valve comprises a check ball elastically supported by a spring for relieving operational shock of the check ball.

The first orifice formed on the line is disposed before the connection with the first branch line leading to the 2-3/4-3 shift valve, and the second orifice is disposed close to a connection of the second branch line with the shift timing control valve.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Certain terminology will be used in the following description for convenience and reference only and will not be limiting. The words "right" and "left" will designate directions in the drawings to which reference is made.

Figure 1:
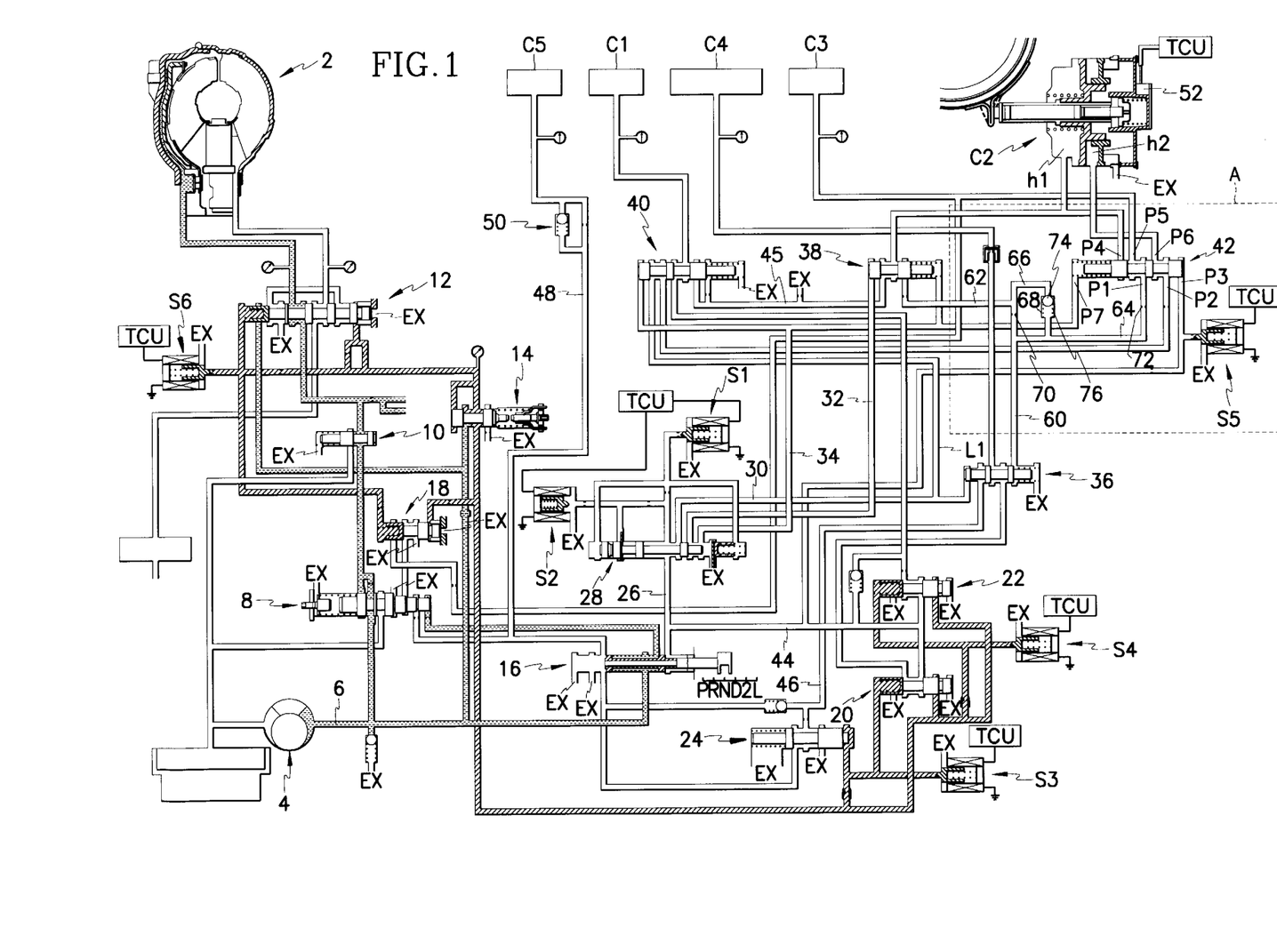
FIG. 1 is an circuit diagram in a neutral N range of a hydraulic control system according to a preferred embodiment of the present invention.
Figure 2:
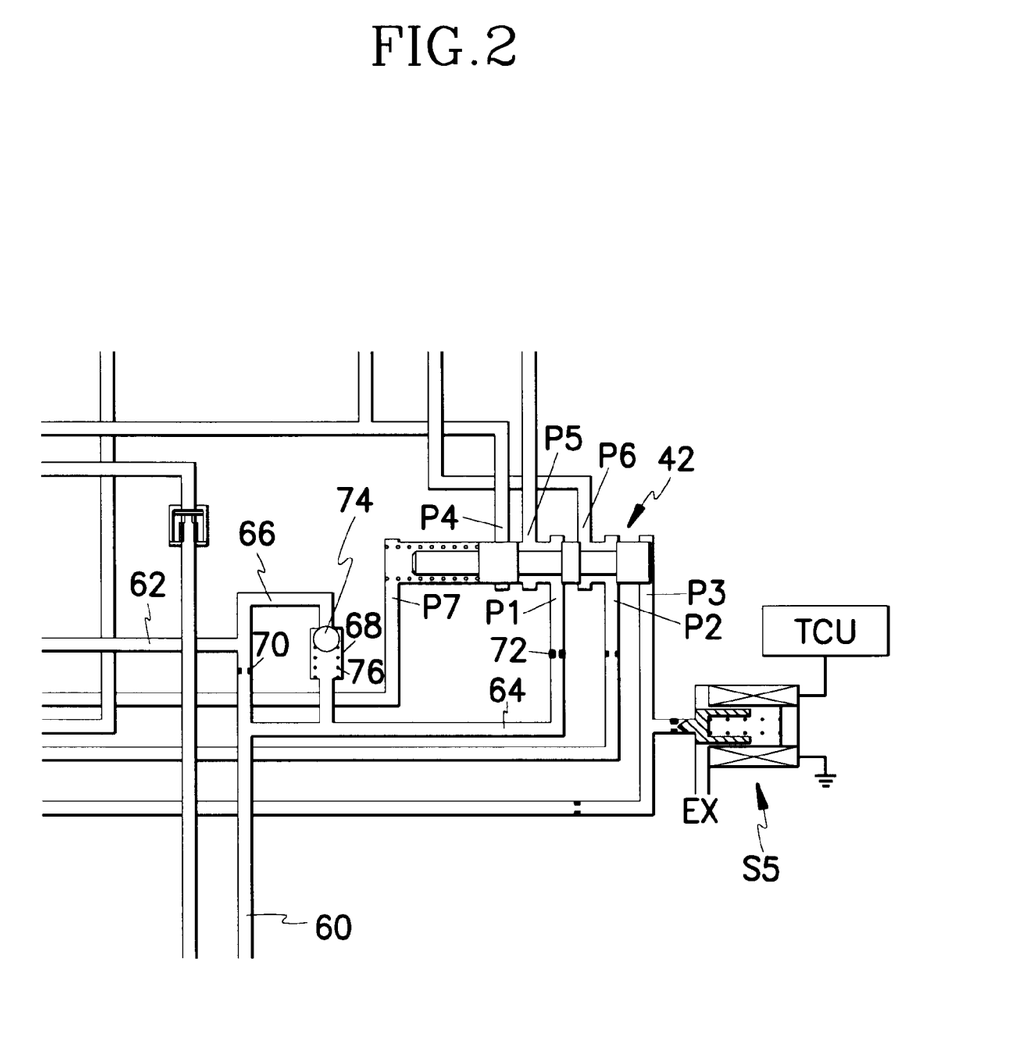
FIG. 2 is an enlarged view of section A of FIG. 1.

FIG. 1 is a circuit diagram in a neutral N range of a hydraulic control system according to a preferred embodiment of the present invention, and FIG. 2 is an enlarged view of section A of FIG. 1. In explaining the preferred embodiment of the present invention, a description of elements identical to the prior art will be omitted, and the same prior art elements, with identical reference numerals appearing in FIG. 6, will be used.

As shown in the drawings, a structure of a shift timing control valve 42 is different from that of the prior art. Namely, the shift timing control valve 42 includes a first port P1 communicating with a 1-2 shift valve 36 and a 2-3/4-3 shift valve 38; a second port P2 communicating with a 2-4/3-4 shift valve 40; a third port P3 communicating with a manual valve 16 to receive line pressure from the same; a fourth port P4 communicating with both a release side chamber h1 of a kickdown servo C2, operating as a reaction element in second and fourth speeds, and the 2-3/4-3 shift valve 38; a fifth port P5 communicating with an end clutch C3, which operates as an input element in third and fourth speeds; and a sixth port P6 communicating with an operational side chamber h2 of the kickdown servo C2.

The above ports are opened and closed by a valve spool provided in the shift timing control valve 42. In a neutral N range, the valve spool is biased toward the right by an elastic member such that the third port P3 is closed.

As shown in FIG. 1, a fourth speed line 34 is further extended to communicate the 2-3/4-3 shift valve 38 with the seventh port P7 of the shift timing control valve 42.

Here, the shift timing control valve 42 is controlled by a shift timing control solenoid valve S5, and as the third port P3 receives line pressure from a first speed line 30, lines controlling shifting from the third speed to the fourth speed can be opened by elastic force of the elastic member elastically supporting the valve spool of the shift timing control valve 42.

Further, a bypass line 66 is formed between branch lines 62 and 64, split from at line 60 supplying hydraulic pressure from a 1-2 shift valve 36 to both the 2-3/4-3 shift valve 38 and the shift timing control valve 42. Disposed on the bypass line 66 is a check valve 68 which suppresses the hydraulic pressure flowing to the 2-3/4-3 shift control valve 38 from the shift timing control valve 42. A check ball 74 is disposed in the check valve 68, the check ball 74 being elastically supported by a spring 76. With this structure, the check valve 68 acts to prevent quick rises in pressure levels such that a separating plate does not become damaged.

Also, orifices 70 and 72 are formed on the line 60 and the branch line 64, respectively. The orifice 70 is formed on the line 60 at a position before the branch line 62 connected to the 2-3/4-3 shift valve 38, and the orifice 72 is disposed on the branch line 64 in proximity to the connection of the same with the shift timing control valve 42.

Figure 3:
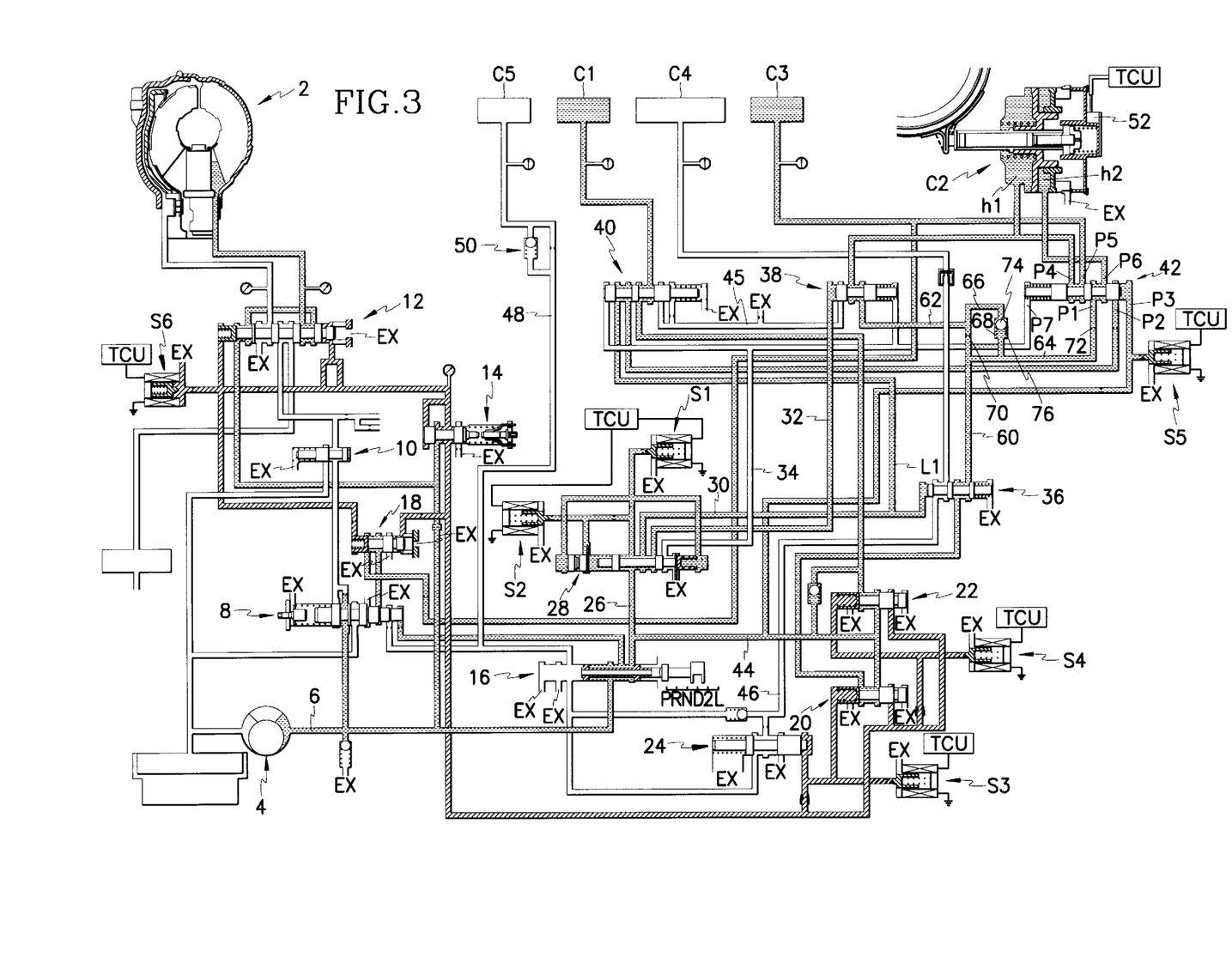
FIG. 3 is a circuit diagram in a third speed of a drive D range of a hydraulic control system according to a preferred embodiment of the present invention.

In the hydraulic control system structured as in the above, when in a third speed of a drive D range, as shown in FIG. 3, first and second solenoid valves S1 and S2 are controlled to OFF. Accordingly, hydraulic pressure flows through second and third speed lines 30 and 32 such that hydraulic pressure from the third speed line 32 is fed to a left-side port of the 2-3/4-3 shift valve 38 to move a valve spool of the same to the right.

Through the above operation, during third speed control, hydraulic pressure standing by at the 2-3/4-3 shift valve 38 is supplied to the release side chamber h1 of a kickdown servo C2 to disengage operation of the same.

Simultaneously with the above, part of the hydraulic pressure supplied to the release side chamber h1 of the kickdown servo C2 is supplied to an end clutch C3 via the shift timing control valve 42 to complete shifting into the third speed.

During the above shifting into the third speed, part of the hydraulic pressure supplied to the end clutch C3 is fed to a high-low pressure valve 18 to control a regulator valve 8 such that line pressure is varied. Namely, line pressure lowered to prevent damage to a hydraulic pump 4 and reduce fuel consumption.

Figure 4:
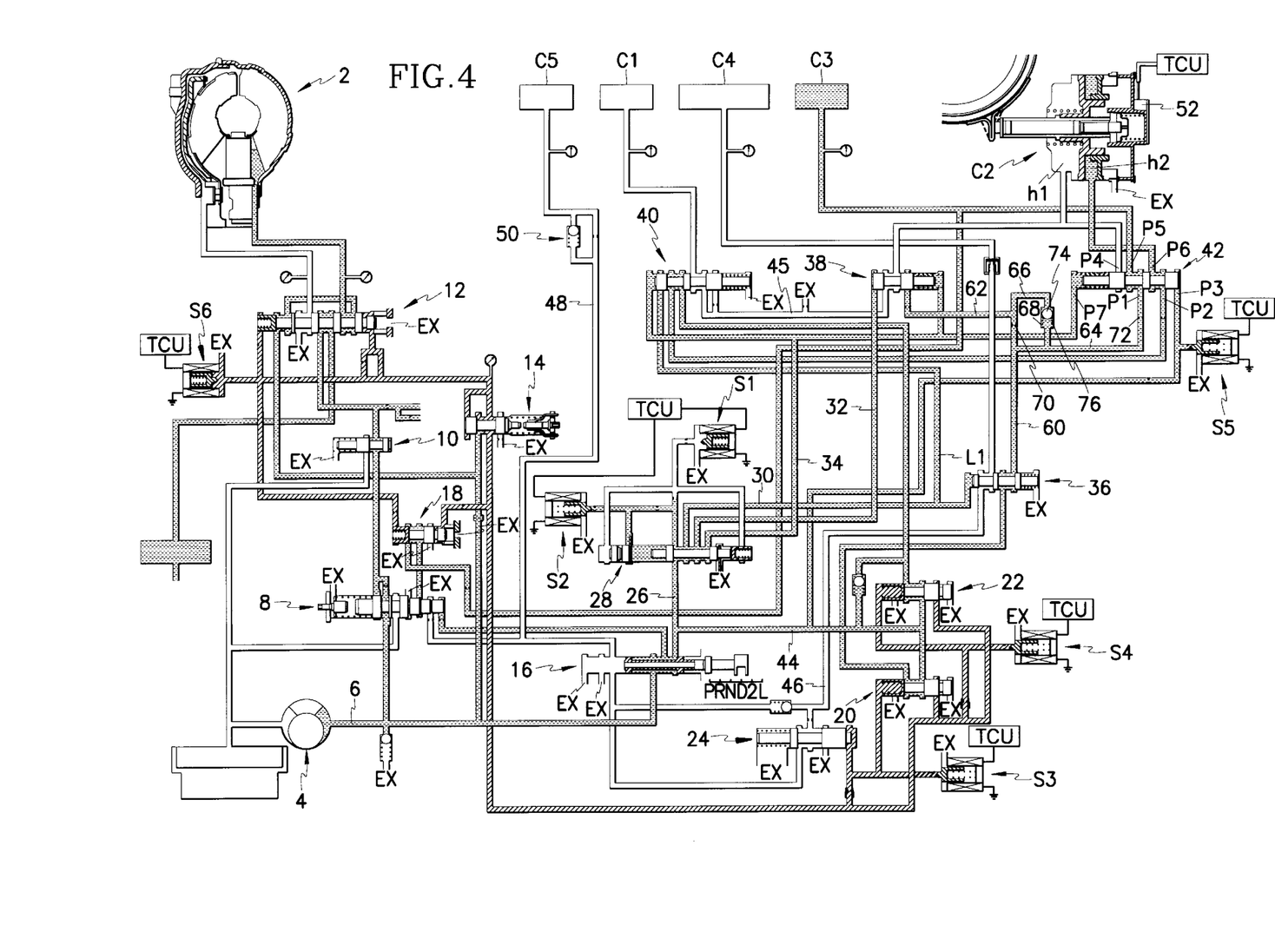
FIG. 4 is a circuit diagram in a fourth speed of the drive D range of a hydraulic control system according to a preferred embodiment of the present invention.

Referring to FIG. 4, if vehicle speed and throttle opening are increased from the above state, a transmission control unit (TCU) controls the second solenoid valve S2 to OFF such that hydraulic pressure flows through the second, third, and fourth speed lines 30, 32, and 34.

Accordingly, the hydraulic pressure flowing through the fourth speed line 34 is supplied to a left-side port of a 2-4/3-4 shift valve 40 to move a valve spool of the same to the right, and to a right-side port of the 2-3/4-3 shift valve 38 to move the valve spool of the same to the left.

Through this control, feeding of hydraulic pressure to a rear clutch C1 from a second pressure control valve 22 via the 2-4/3-4 shift valve 40 is discontinued and supplied to the kickdown servo C2 through the shift timing control valve 42.

Further, hydraulic pressure being fed to the release side chamber h1 of the kickdown servo C2 passes through the 2-3/4-3 shift valve 38 and is discharged through an exhaust port (Ex) of the 2-4/3-4 shift valve 40. Namely, third speed shifting is realized with the operation of the rear clutch C1 and the end clutch C3, while fourth speed shifting is realized with the operation of the end clutch C3 and the kickdown servo C2.

Figure 5:
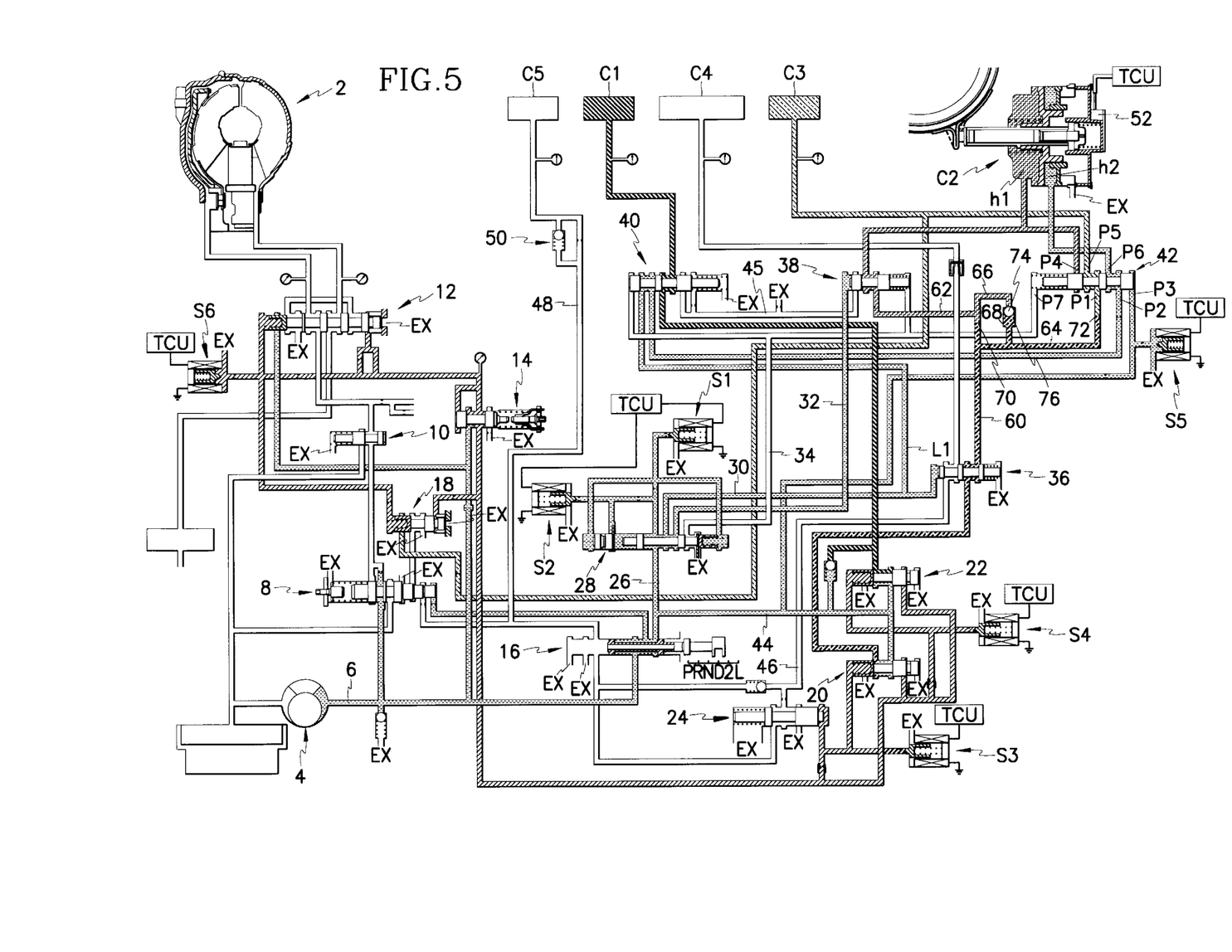
FIG. 5 is a circuit diagram during 4-3 downshifting of a hydraulic control system according to a preferred embodiment of the present invention.

When downshifting to the third speed from the fourth speed, the kickdown servo C2 is disengaged while the rear clutch C1 is operated. To realize disengagement of the kickdown servo C2, by operation of the third solenoid valve S3, the release side chamber h1 of the kickdown servo C2 is communicated with the end clutch C3 in a state where pressure of the operational side chamber h2 is maintained supplied to the same.

At the beginning of shifting, pressure of the end clutch C3 is initially maintained in a high level state then slowly reduced by low duty of the third solenoid valve S3. At the same time, the valve spool of the 2-3/4-3 shift valve 38 as fourth speed pressure is realized by control of the shift control valve 26. Further, part of the hydraulic pressure supplied to the end clutch C3 is fed to the release side chamber h1 of the kickdown servo C2 to disengage the same.

Here, as shown in FIG. 2, by the formation of the orifice 70, formed in the branch line 62 which supplied hydraulic pressure to the 2-3/4-3 shift valve 38, hydraulic pressure is slowly supplied to the release side chamber h1 of the kickdown servo C2 such that the same is slowly disengaged. Here, pressure of the end clutch C3, which is communicating with the kickdown servo C2, is controlled by the orifice 72 formed on the branch line 64.

Figure 8:
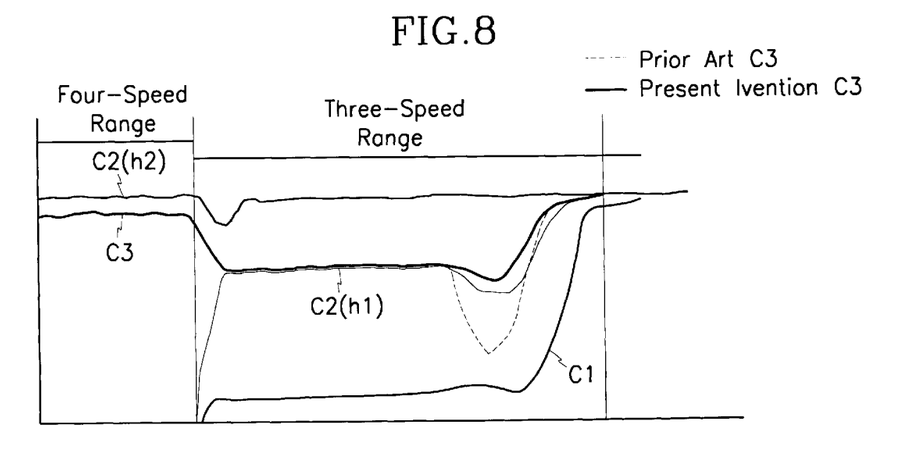
FIG. 8 is a graph showing the flow of hydraulic pressure of a friction elements, and particularly illustrates a comparison of end clutch pressure between the present invention and the prior art.

As shown in FIG. 8, pressure operating on the end clutch C3 is minimally reduced, unlike in the prior art shown by the dotted line in the graph. Accordingly, engine run-up and damage to the end clutch C3 are prevented.

In addition, the check valve 68 enables the quick release of the hydraulic pressure supplied to the release side chamber h1 of the kickdown servo C2 during the end of shifting.

Further, in the present invention, in a state where third speed shifting is completed as shown in FIG. 3, upshifting is realized by discontinuing the supply of hydraulic pressure to the rear clutch C1 from the second pressure control valve 22, while hydraulic pressure is fed to the timing control valve 42 from the 2-4/3-4 shift valve 28 then to the operational side chamber h1 of the kickdown servo C2 as control pressure.

Hydraulic pressure controlled in the second pressure control valve 22 is supplied to the end clutch C3 through the 2-4/3-4 shift valve 40 and the shift control solenoid valve 42. Here, the hydraulic pressure supplied to the release side chamber h2 of the kickdown servo C2 passes through the 2-3/4-3 shift valve 38 and is discharged through an exhaust port (Ex) provided on a line 45, as is the hydraulic pressure supplied through the rear clutch C1 after passing through the 2-4/3-4 shift valve 40. This operation is made possible by controlling the shift timing control solenoid valve S5, which controls the shift timing control valve 42, to OFF such that an exhaust port Ex of the shift timing control solenoid valve S5 is blocked to prevent problems of insufficient pressure when line pressure is varied.

In the hydraulic control system for automatic transmissions structured as in the above, damage to an end clutch and engine run-up caused by a reduction in end clutch pressure are prevented when 4-3 downshifting in a power ON state. Further, because the shift timing control solenoid valve is controlled to OFF when line pressure is varied in a fourth speed state, the problem of insufficient hydraulic pressure is prevented.

Other embodiments of the invention, will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A hydraulic control system for automatic transmissions, including a plurality of friction elements engaged at respective transmission speeds, comprising:
   a hydraulic pressure source;
   hydraulic pressure regulating means for controlling hydraulic pressure from the hydraulic pressure source to constant line pressure;
   damper clutch control means for actuating a damper clutch of the torque converter by supplying hydraulic pressure fed from the pressure regulating means to the torque converter;
   shift control means for selecting a shift mode by converting hydraulic pressure from the pressure regulating means into drive pressure corresponding to each speed stage;
   hydraulic pressure control means for controlling the drive pressure from the shift control means; and
   hydraulic pressure distributing means for distributing hydraulic pressure from the hydraulic pressure control means to each friction element for each speed, said hydraulic pressure distributing means comprising:
   a 1-2 shift valve;
   a 2-3/4-3 shift valve; and
   shift timing control means having a shift timing control valve for supplying hydraulic pressure to an end clutch acting as an input friction element for third and fourth speeds and to a kickdown servo acting as a reaction friction element for second and fourth speeds, and a solenoid valve for controlling hydraulic pressure supply timing from the shift timing control valve to said end clutch and kickdown servo by control of a transmission control unit; and
   hydraulic pressure compensating means for maintaining a suitable level of end clutch pressure mounted on a line for supplying hydraulic pressure from the 1-2 shift valve to the 2-3/4-3 shift valve and the shift timing control valve.

2. The hydraulic control system of claim 1, wherein the hydraulic pressure distributing means further comprises a 2-4/3-4 shift valve,
   wherein the shift timing control valve comprising a valve spool for controlling port conversion of the shift timing control valve, and being provided with a first port for receiving hydraulic pressure from the shift control means via the 1-2 shift valve, a second port for receiving hydraulic pressure from the shift control means via the 2-4/3-4 shift valve, a third port for receiving line pressure from the shift control means, a fourth port for receiving hydraulic pressure from a release side chamber of the kickdown servo, a fifth port for supplying hydraulic pressure coming through the fourth or first port to the end clutch, a sixth port for supplying hydraulic pressure coming through the first port of the second port to the operational side chamber of the kickdown servo, and a seventh port for closing the third port for fourth speed control by receiving hydraulic pressure from the shift control means.

3. The hydraulic control system of claim 2, wherein the seventh port is connected to the 2-3/4-3 shift valve and the 2-4/3-4 shift valve.

4. The hydraulic control system of claim 1, wherein the hydraulic pressure compensating means comprises:
- a bypass line formed between first and second branch lines, split from a line supplying hydraulic pressure from a 1-2 shift valve to a 2-3/4-3 shift valve and the shift timing control valve;
- a check valve disposed on the bypass line and which suppresses the hydraulic pressure flowing to the 2-3/4-3 shift control valve from the shift timing control valve;
- a first orifice formed on a line before connection of the same with the first branch line; and
- a second orifice formed on the second branch line.

5. The hydraulic control system of claim 4, wherein the check valve comprises a check ball elastically supported by a spring for relieving operational shock of the check ball.

6. The hydraulic control system of claim 1, wherein the first orifice formed on the line is disposed before the connection with the first branch line leading to the 2-3/4-3 shift valve, and the second orifice is disposed close to a connection of the second branch line with the shift timing control valve.

* * * * *